United States Patent [19]
Tuceryan et al.

[11] Patent Number: 6,044,168
[45] Date of Patent: Mar. 28, 2000

[54] MODEL BASED FACED CODING AND DECODING USING FEATURE DETECTION AND EIGENFACE CODING

[75] Inventors: Mihran Tuceryan; Bruce E. Flinchbaugh, both of Dallas, Tex.

[73] Assignee: Texas Instruments Incorporated, Dallas, Tex.

[21] Appl. No.: 08/970,301

[22] Filed: Nov. 14, 1997

Related U.S. Application Data

[60] Provisional application No. 60/031,758, Nov. 25, 1996.

[51] Int. Cl.[7] .............................. G06K 9/36; G06T 17/20; H04N 1/41
[52] U.S. Cl. .......................... 382/118; 382/103; 382/232; 382/285; 382/215; 345/425; 345/430; 348/15; 348/25; 348/390
[58] Field of Search ...................................... 382/103, 115, 382/118, 173, 201, 217, 218, 232, 282, 285, 286, 215, 283; 345/473, 425, 430, 433–439; 340/825.34; 348/15, 25, 169, 384, 390

[56] References Cited

U.S. PATENT DOCUMENTS

| | | | |
|---|---|---|---|
| 5,432,864 | 7/1995 | Lu et al. .................................. | 382/118 |
| 5,719,951 | 2/1998 | Shackleton et al. ..................... | 382/118 |

OTHER PUBLICATIONS

Kiyoharu Aizawa et al., Model–Based Image Coding: Advanced Video Coding Techniques for Very Low Bit–Rate Applications, Proceedings of the IEEE, vol. 83, Issue 2, pp. 259–271, Feb. 1995.

Haibo Li et al., 3–D Motion Estimation in Model–Based Facial Image Coding, IEEE Transactions on Pattern Analysis and Machine Intelligence, vol. 15, Issue 6, pp. 545–555, Jun. 1993.

Alan L. Yuille et al., Feature Extraction from Faces Using Deformable Templates, Proceedings of Computer Vision and Pattern Recognition, Jun. 1989, pp. 104–109.

King N. Ngan et al., Automatic Face Location Detection and Tracking for Model–Based Video Coding, 3rd International Conference on Signal Processing, Oct. 1996, vol. 2, pp. 1098–1101.

P.M. Antoszczyszyn et al., Local Motion Tracking in Semantic–Based Coding of Videophone Sequences, Sixth International Conference on Image Processing and its Applications, Jul. 1997, vol. 1, pp. 46–50.

Chang Seok Choi et al., Analysis and Synthesis of Facial Image Sequences in Model–Based Image Coding, IEEE Transactions on Circuits and Systems for Video Technology, vol. 4, Issue 3, pp. 257–275, Jun. 1994.

Baback Moghaddam et al., An Automatic System for Model–Based Coding of Faces, Proceedings of Data Compression Conference, Mar. 1995, pp. 362–370.

Matthew Turk et al., Eigenfaces for Recognition, Journal of Cognitive Neuroscience, vol. 3, No. 1, pp. 71–86, 1991.

*Primary Examiner*—Leo H. Boudreau
*Assistant Examiner*—Brian P. Werner
*Attorney, Agent, or Firm*—Robert L. Troike; Frederick J. Telecky, Jr

[57] ABSTRACT

The method uses a three-dimensional face model and a technique called eigenface decomposition to analyze the video at one end. The facial feature locations and eigenface coding of the face image are sent to a decoder. The decoder synthesizes the face image at the receiving end. Eigenface decoding is used to texture map a three-dimensional model warped by detected feature locations.

16 Claims, 6 Drawing Sheets

MODEL BASED FACED CODING AND DECODING USING FEATURE DETECTION AND EIGENFACE CODING

This application claims priority under 35 USC § 119(e)(1) of provisional application No. 60/031,758, filed Nov. 25, 1996.

TECHNICAL FIELD OF THE INVENTION

The present invention relates to visual communications of a facial image.

BACKGROUND OF THE INVENTION

Very low bit-rate communication channels such as wireless telephone lines require extremely high compression rates. One particular need is in video conferencing. It is generally assumed that the traditional, signal processing based compression schemes are not going to be sufficient to achieve such high compression rates. The alternative is to use as much domain knowledge which the sender and receiver share and only send the information which is specific to the particular scene and/or situation which would allow the receiving end to reconstruct the visual information.

There are a number of previous works in the area of model based video coding which are relevant to the invention described here. (See for example, K. Aizawa and T. S. Huang, "Model-based image coding: Advanced video coding techniques for very low bit rate applications." *Proceedings of IEEE,* 83(2): 259–271, February 1995; Demetri Terzopoulos and Keith Waters, "Analysis and synthesis of facial image sequences using physical and anatomical models, *IEEE Transactions on Pattern Analysis and Machine Intelligence,* 15(6): 569–579, June 1993.; and Haibo Li, Pertti Roivainen, and Robert Forchheimer. "3-D motion estimation in model-based facial image coding. *IEEE Transaction on Pattern Analysis and Machine Intelligence,* 15(6):545–555, June 1993.) Two works that are closely tied to the current invention are the eigenface coding by Pentland, et al. (See Baback Moghaddam and Alex Pentland, "An automatic system for model-based coding of faces," In *Proc. of the IEEE Data Compression Conference,* Snowbird, Utah, March 1995. IEEE) and the feature based facial model fitting by Li-An Tang from the University of Illinois. (See Li-An Tang. *Human Face Modeling, Analysis and Synthesis.* Ph.D. thesis, Electrical Engineering Department, University of Illinois at Urbana-Champain, Urbana, Ill., 1996.) In the case of the eigenface coding, the coding is done on the images and there is no further 3D modeling involved. In the case of the facial feature based model fitting, the facial model is fit, but the texture mapped image of the face is the original full face image. Many of the other previous works either work in 2D; or they work with no texture mapping (See Irfan A. Essa and Alex P. Pentland, "Facial expression recognition using a dynamic model and motion energy", In *International Conference on Computer Vision '95,* Cambridge, Mass., June 1995.) or with texture mapping using original images or sub-images.

It is highly desirable to send a facial image in a highly compressed manner.

SUMMARY OF THE INVENTION

In accordance with one embodiment of the present invention, eigenface decoding is used to do texture mapping of 3D face models. Eigenface parameters are encoded and sent with face location and facial feature locations to a remote location. At a remote location the facial feature locations are used to warp a 3D face model. The decoded eigenface parameters are used to texture map the warped 3D model to synthesize the facial image at the receiving end.

BRIEF DESCRIPTION OF THE DRAWINGS

For a better understanding of the present invention, reference may be made to the accompanying drawings, in which:

FIG. 4 illustrates the generic wire-frame face model wherein FIG. 4a illustrates the total face model, FIG. 4b illustrates the face parts in the model: eyes, eyebrows, teeth, and nose, and FIG. 4c the model of the skin and the face;

FIG. 13 illustrates the eigenface process wherein FIG. 13a illustrates the original image containing the face, FIG. 13b the face extracted from FIG. 13a by the face localization method, FIG. 13c the masked and normalized (now) face to be coded, and FIG. 13d illustrates the reconstructed face from the coded face victor; FIG. 14a is a face model looking forward, the middle picture FIG. 14b has the face model looking down and the right most picture FIG. 14c has the face model looking up.

DESCRIPTION OF ONE EMBODIMENT OF THE PRESENT INVENTION

Figure 1:
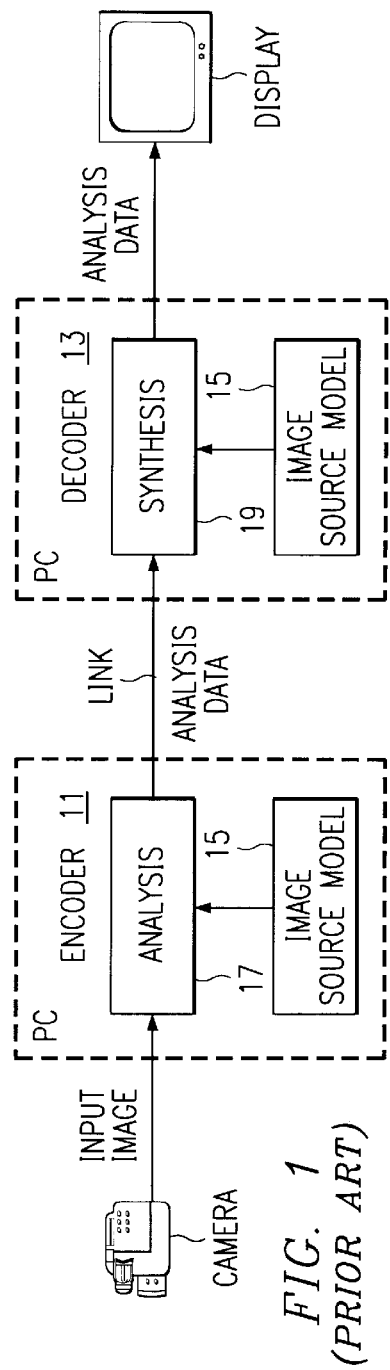
FIG. 1 illustrates an overall system for model based visual communication system.

A model based communication system 10 is shown in FIG. 1. The system may be video conferencing with, for example, a PC (personal computer) with a modem and a video board and a camera and monitor at both ends and a communications link therebetween. The details of the individual program modules loaded in the PC's for this application are given in FIGS. 2 and 3. Both the encoder 11 and decoder 13 also in a PC with a memory and a display has an image source model 15 stored into a database. The input image undergoes analysis at analyzer 17 with respect to the image source model 15 and the analysis data is sent to a synthesizer 19 at decoder 13 to produce the received output image at the display.

Figure 2:
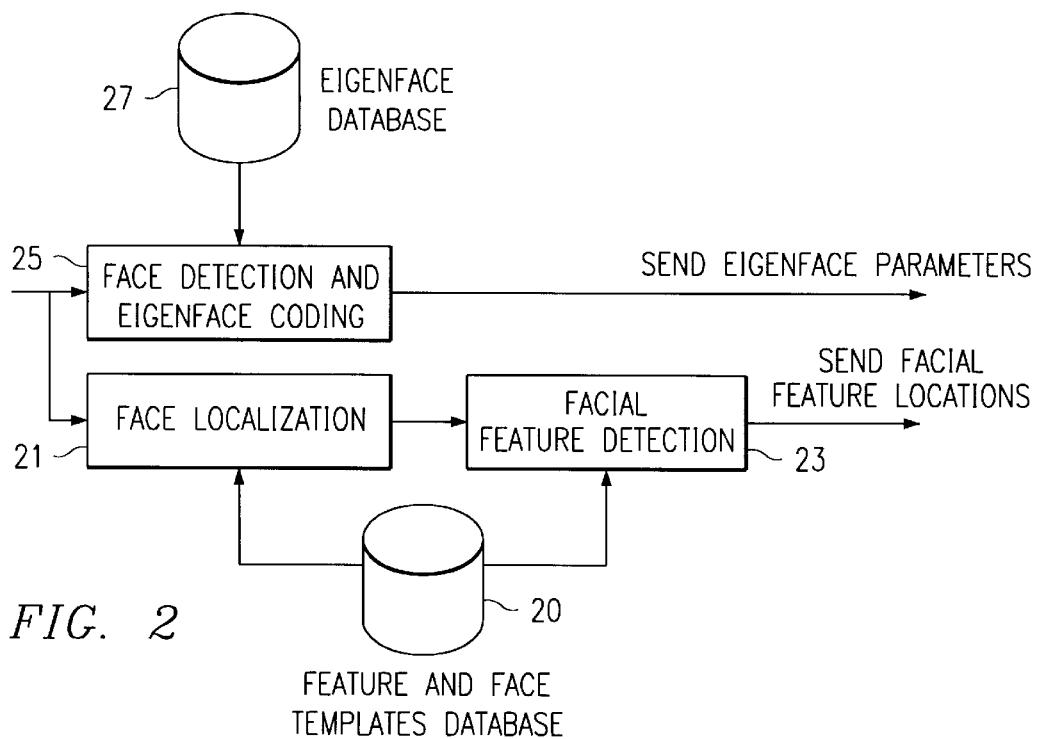
FIG. 2 illustrates a diagram of an encoder according to one embodiment of the present invention.

The main parts of the system are as follows based on FIGS. 2 and 3. FIG. 2 illustrates the encoder 11 which includes a feature and face templates in database 20. The encoder includes face localizations program for analyzing the input image received by the PC (encoder). Face localization is part of the facial program analysis module. It uses a multi-scale facial template from database 20 and computes a normalized cross-correlation coefficient for each pixel in the image at multiple scales. It then picks the point in the image with the highest correlation coefficient at the best scale as the location of the face.

The encoder also includes a face feature detection program module 23. Face feature detection program module 23 uses the output from the face localization module 21 and uses knowledge about the configuration of facial features in the face to determine where various facial features are located. The facial features detected in this module are the corners of the eyes, corners of the mouth, tip and sides of the nose, and top and side points of the facial outline. The feature location are sent to the decoder 13. This information is then used to warp generic 3D facial model at the receiving end (decoder) to adapt it to the particular individual in the video.

The encoder includes eigenface encoding program module 25. This module uses an eigenface database 27 and the input image to determine the face location, mask the face from the background, normalize it to a standard size, and then encodes it using the KL expansion. A KL (Karhuuen—Loéve) expansion is also known as principal componenta analysis. The object of KL is to find a lower dimensional representation that accounts for the variance for the features. In the present invention, this is done by finding the eigenvectors and eigenvalues of the points in the face space represented by the training set of images, and picking M largest eigenvalues, thus representing the faces by points in a lower-dimensional space. This allows the whole face image to be coded by a small number of bytes (approximately 100 floating point numbers). The result is eigenface parameters that are sent separate from the facial feature locations to the decoder. The eigenface parameters are eigenvalues and eigenvectors of a covariance matrix corresponding to the original face images. Only the eigenvalues are sent. The eigenface database 27 is a set of vectors based on training of 3000–4000 faces (best 100 may be used). A face image I(x, y) can be an N×N array of 8-bit intensity values. This also can be considered a vector of size $N^2$. A typical image of size 256×256 becomes a vector of dimension 65,536 or a point in a 65,536 dimensional space. In the eigen vector encoding the analysis is to find vectors that best account for the distribution of face images within the entire image space. Each vector is a length $N^2$ (describes N×N image and is a linear combination of the original face images).

Figure 3:
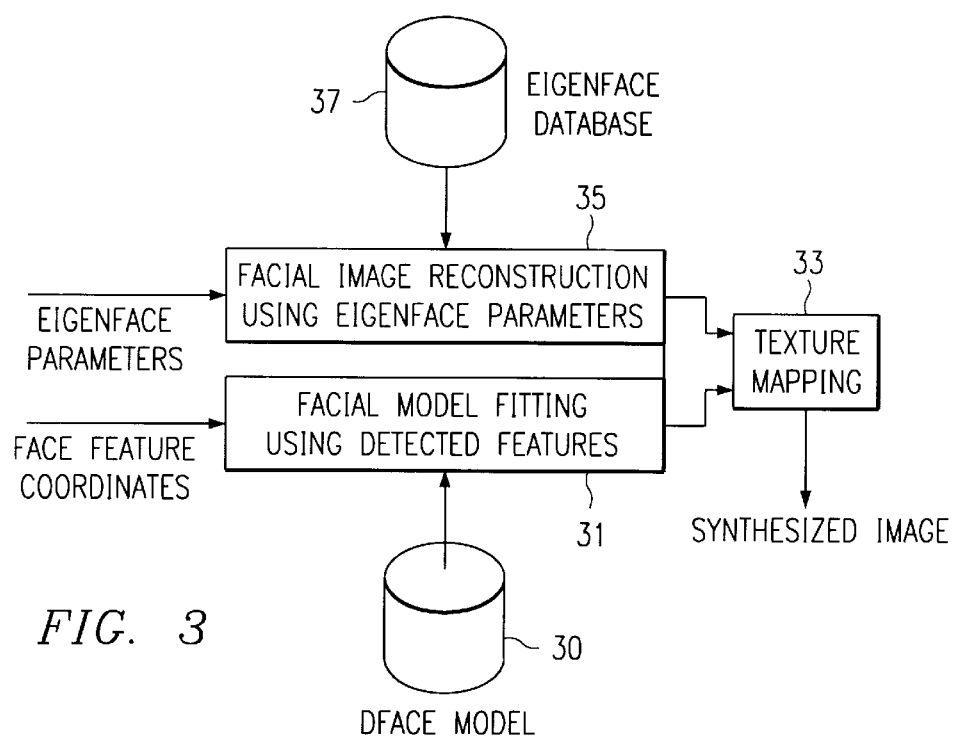
FIG. 3 illustrates a diagram of the decoder according to one embodiment of the present invention.

Referring to FIG. 3 there is illustrated the decoder 13 where an eigenface decoding program module 35 reconstructs the face image from the eigenface encoding coefficients (eiginvalues) sent over by the encoder side using the same eigenface database 37 as database 27. A facial model fitting program module 31 uses the facial feature locations detected at the encoder end and sent over to the receiver to warp a 3D generic face model stored at database 30 to the particular person's face. A texture mapping program module 33 uses the reconstructed face image from the eigenface encoding coefficients to define a texture. This reconstructed texture image is then mapped onto the fitted 3D face model which is to be animated subsequently by sending new feature coordinates.

Facial analysis is done in two steps: (i) initialization, and (ii) tracking of dynamic facial images. The modules are shown in FIG. 2.

Figure 4:
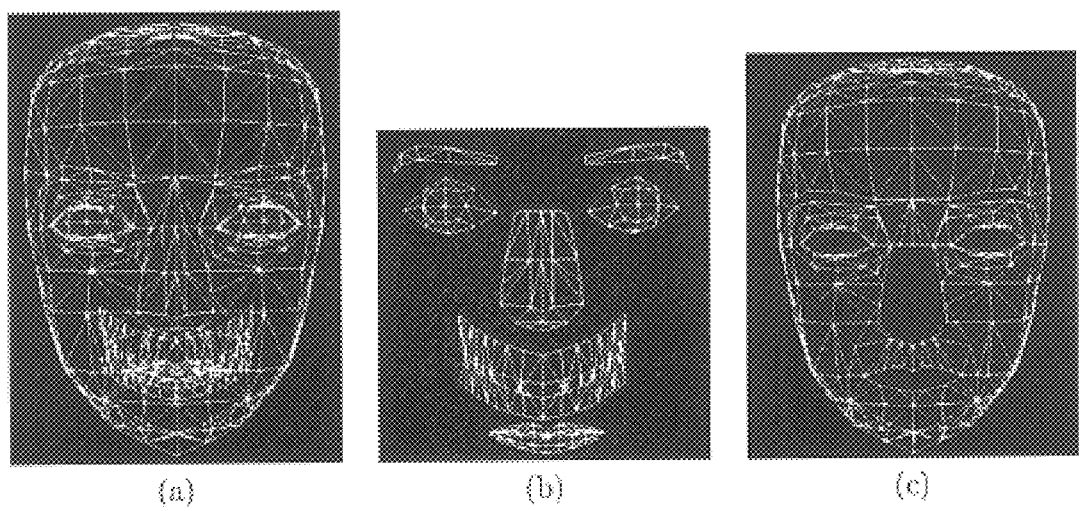

The 3D face model is the one used by Li-An Tang from University of Illinois thesis (See above citation). See Li-An Tang, Ph.D., thesis entitled "Human Face Modeling, Analysis and Synthesis," Electrical Engineering Department, University of Illinois at Urbana-Champain, Urbana, Ill. 1996. This thesis is incorporated herein by reference. It is a triangular mesh consisting of 383 vertices and 638 triangles. As shown in FIG. 4, it consists of facial skin, eyes, nose, eyebrows, lips, and teeth. FIG. 4a is the total face model which results when combining FIG. 4b with FIG. 4c. FIG. 4b is the face parts model of eyes, eyebrows, lips, teeth, and nose. FIG. 4c is the model of the skin of the face. This generic model is warped to fit the particular individual's facial dimensions in the image.

Figure 5:
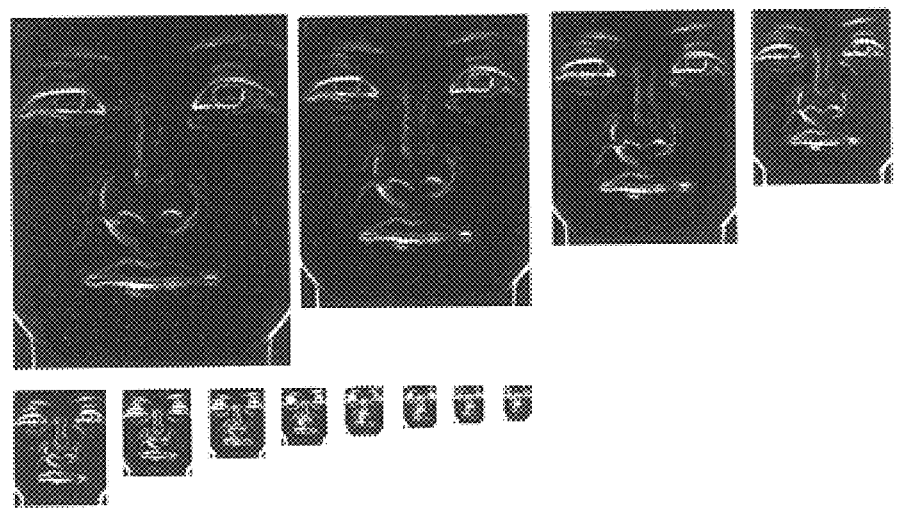
FIG. 5 illustrates a set of multi-scale templates used to localize a face in an image.

Face localization module works by using a set of face templates at multiple scales from the database 20 in FIG. 2. The templates used are those used in Li-An Tang/thesis cited above and they are shown in FIG. 5. These templates are used to localize a face in an image.

Figure 6:
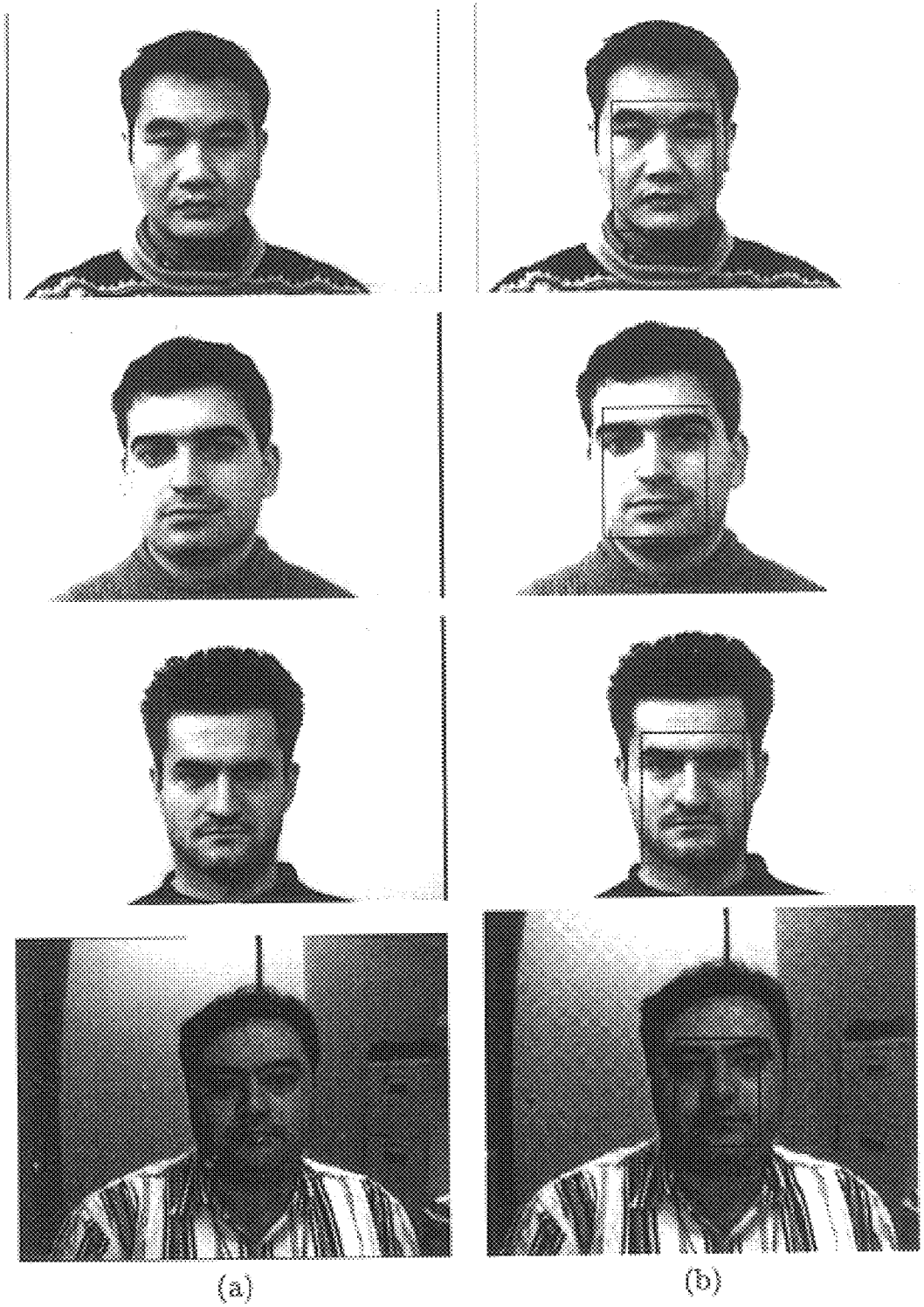
FIG. 6 illustrates same example input images and a localized face where column 6a are the original images and column 6b are the faces located in the images.

The algorithm of the program in the encoder builds a pyramid structure of the edge map of the input image and starts correlating the templates at the coarsest resolution. Gradient magnitude based on Sobel filter is used as the edge map for each image in the pyramid. The facial templates are also defined based on the edge map images as can be seen in FIG. 5. All the templates with sizes smaller than the current image are used and the template with the best correlation coefficient is recorded (both the location of the best match in the image and the scale of the template). This gives an initial estimate of the face location at the coarsest possible level. The algorithm moves to the next scale in the pyramid of the image and the process is repeated at the finer resolution. The search at the finer resolutions is limited, however, to a smaller window around the initial estimate of the face location at the lower resolution. In the end the location of the best template match at the finest resolution gives the location of the face in the image. FIG. 6 gives some example input image and the localized face where column 6(a) is the original image and column 6(b) are the faces located in the images.

Figure 7:
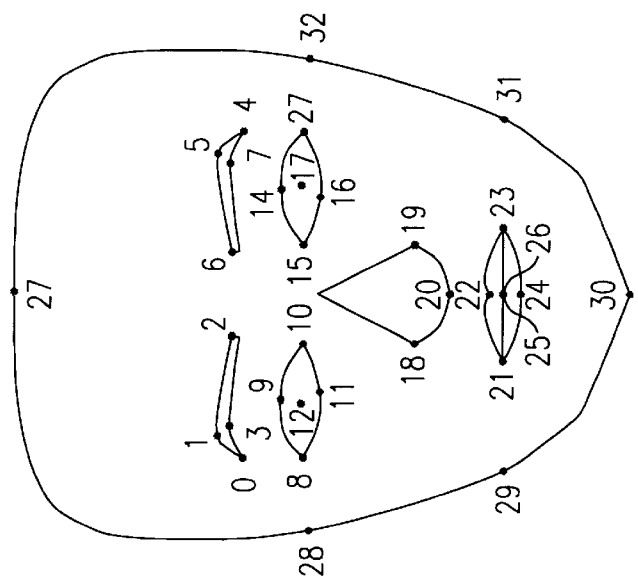
FIG. 7 illustrates the model that defines the configuration of the facial features.

Once the face is localized as described in the previous section, the knowledge about the structure of a face is known. The relationships between the various facial features are known and the symmetry that exists can be exploited. Thus the search for the facial features could be constrained to a great degree. The process of facial feature detection that has been implemented in this work is a refinement of the positions that are initially estimated using the localization information of the face. FIG. 7 shows the facial features detected by the current implementation of the detection algorithm. These facial features correspond to vertices in the 3D wire mesh model of the face. The detected facial features are then used to custom fit the generic face model to a particular individual in the synthesis stage. The knowledge of the facial feature configuration puts constraints on the search for the detection of individual features.

Figure 8:
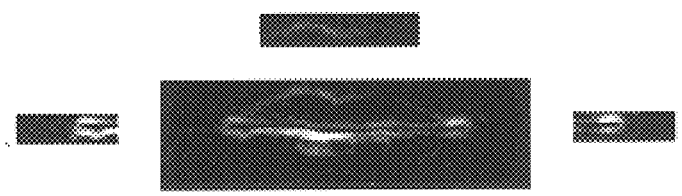
FIG. 8 illustrates the templates used to refine the localization of the mouth feature in a face image.

This refinement of facial feature locations is done by template matching of the facial features. Templates are used (e.g., FIG. 8 shows the templates for detecting the mouth features) for each of the facial features. In this step, however, the search window within which template correlation is performed for each of the facial features is constrained by the structure of the face. The result of the localization in the initial step and a face configuration model is used to determine initial guesses for the position of each facial feature. The feature detection is then performed by correlating the template image within a search window (11×11 in this case) and picking the location with the highest normalized correlation coefficient.

In the case of the eyes, symmetry constraints are used as follows:

1. Assume the left eye location is correct, and find its symmetric corresponding point (with respect to the mid-face). Use this as the initial guess for the location of the right eye. Find the best correlated possession within a search window for the right eye. Compute the sum of normalized correlation coefficients for the right and left eyes ($\rho_1$).
2. Assume the right eye position is correct, and find its symmetric corresponding point. As with the right eye, find the best correlated position for the left eye. Compute the sum of normalized correlation coefficients for the right and left eyes ($\rho_2$).

The eye location configuration with $\rho = \max(\rho_1, \rho_2)$ is picked.

In the case of the lips, after the mouth is located, the top and bottom points of the lips are further refined by finding the parabola along which the total contrast is maximum. The parabolas are defined by the three points: two corners of the mouth (points 21 and 23 in FIG. 7) and either the top (point 22 in FIG. 7) or the bottom (point 24 in FIG. 7) points of the mouth. The locations of the top/bottom of the lips is varied along the vertical within a search window (±5 pixels) and the point with the maximum total contrast along the defining parabola is noted.

Figure 9:
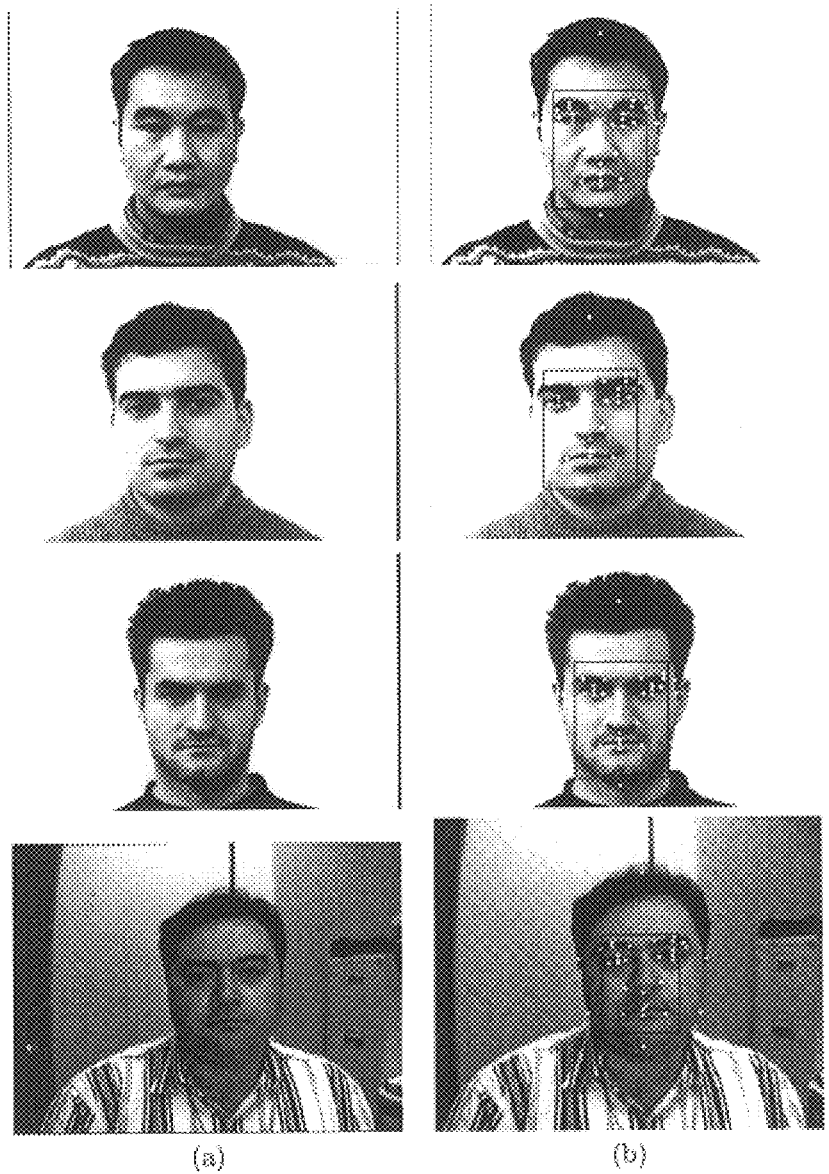
FIG. 9 illustrates the detected facial feature for all the images shown in FIG. 6 wherein column 9a shows the original image and column 9b shows the localized faces (in rectangle) and the detected facial features are shown as white dots.

FIG. 9 shows the detected facial features for all the images shown in FIG. 6 where column 9(a) shows the original image and column 9(b) shows the localized faces (rectangles) and the detected facial features as white dots. The detected facial features are used to warp the 3D face model from database 30 to the particular individual. The details are described below under facial synthesis.

Facial Synthesis

The facial features detected as described in the previous sections are used to warp the generic face model described above so that it is adapted to the particular person in the image. This warping is accomplished by the estimation of a set of simple warping transformations. The face is divided into three parts: top, middle, and bottom. Referring to FIG. 7, the top of the face is defined by the feature points 27, 28, and 32. The middle part is the rectangular region defined by the features 28, 29, 31, and 32. The bottom part is defined by the features 29, 31, and 30.

For the upper and lower parts of the face, an affine transform is used to warp the face, and for the middle part, a bilinear transform is used. The affine transform is defined as:

$$x_i = a_0 + a_1 x_m + a_2 y_m$$
$$y_i = a_3 + a_4 x_m + a_5 y_m$$

where $(x_i, y_i)$ are the image feature coordinates in the image and $(x_m, y_m)$ are the feature coordinates in the model. The desired transform that maps the model coordinates to image coordinates is defined by the coefficients, $a_k$ for $k=0, \ldots, 5$. These affine transform coefficients are estimated from the detected facial features and the corresponding model features coordinates using a least squares estimation.

The bilinear transform is defined as:

$$x_i = a_0 + a_1 x_m + a_2 y_m + a_3 x_m y_m$$
$$y_i = a_4 + a_5 x_m + a_6 y_m + a_7 x_m y_m$$

The bilinear transform coefficients, $a_k$, are also estimated using a least squares method. The model is then warped by applying these warping transformations to the remaining vertices of the 3D face model.

Figure 10:
FIG. 10 illustrates for an example, input image, the original image 10a, the warped model to fit the individuals face 10b and the warped model rendered using texture mapping.

The warping of the face model is then followed by using the original image and the warped model coordinates to defined a texture map. The face image is rendered using this texture mapping to obtain increased realism. FIG. 10 shows an example input image, the warped model, and the texture mapped model rendered from different viewpoints.

Figure 11:
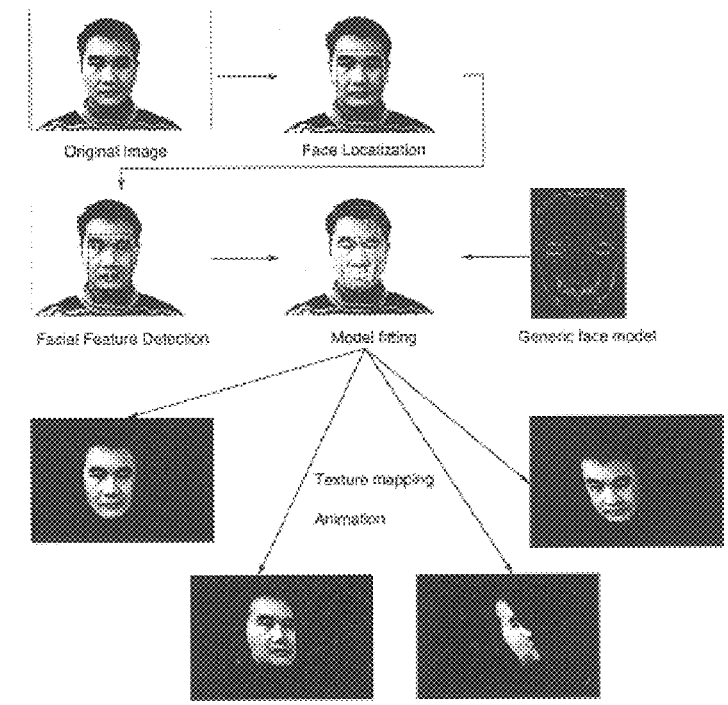
FIG. 11 illustrates a running example showing each of the steps in the analysis of an input image and synthesis of the resulting model.

Finally, FIG. 11 shows a summary of all the steps involved in the process with the snapshots of rendered face model undergoing rigid motion animation.

Facial Encoding

The face image to be texture mapped can be sent to the receiving end of the communications. However, this would normally involve a large number of bits to be transferred. Even though this would not have to be done all the time during the communication process, when such applications as putting the personal face information on smart cards or calling cards are considered, one would like to reduce this overhead further if possible. One way to do this is by coding the face image using the eigenface decomposition method from MIT Media Lab as described by Turk, et al. ("Eigenfaces for Recognition," in Journal of Cognitive Neuroscience, Vol. 2(1): 71–86, 1991.) cited above. This is incorporated herein by reference.

Figure 12:
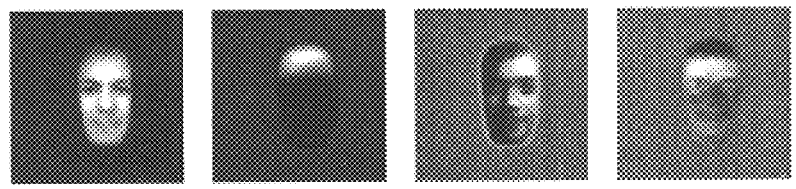
FIG. 12 illustrates first four eigenfaces of a trained eigenface coding system.

The procedure uses a training database and KL expansion method to represent the face space. FIG. 12 shows the first few eigenfaces computed on a training set of 3000 face images.

Once these eigenfaces are computed on a training set of 3000 face image $\Gamma$ is transformed to its "eigenface" representation (projected into eigenface space) by the operation:

$$\omega_k = u_k^T (\Gamma - \Psi)$$

for $k=1, \ldots M$. Here $\Psi$ is the average face computed from the training set and $u_k$ are the eigen vectors of the training set. M is the number of eigen vectors used to represent the eigenface space. The weights vector $\Omega^T = \{\omega_1, \omega_2, \ldots, \omega_M\}$ represents the contribution of each eigenface in representing the input face image $\Gamma$.

This operation can be reversed and the coded image representation can be re-projected back to the image space, thus reconstructing the original face image. In this case, only the encoded weights vector $\Omega$ need to be sent over the communication channel (as long as the models in the form of eigen vectors, $u_k^T$ and $\Psi$ are shared by both sender and receiver). $u_k^T$ and $\Psi$ are stored in databases 27 and 37.

Figure 13:

FIG. 13 shows an example input image (the one shown above in FIG. 11), and the various intermediate steps during the coding of the face image. The coding of the face results in the weight vector $\Omega$ which consists of 100 floating point numbers (or 400 bytes of data) and two affine transformation matrices consisting of 12 floating point numbers (48 bytes of data). Thus the whole face image can be coded in 448 bytes of data. This can be further reduced by other coding techniques if desired.

Figure 14:
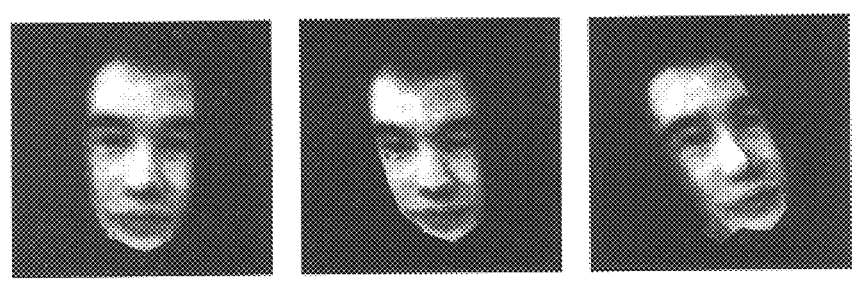
FIG. 14 illustrates eigenface encoded-decoded image being texture mapped to fitted face image and animated using rigid head motion where the left most picture

In this work, we used this method to code the face image at the sending site and reconstructed it at the receiving site to be used as an image for texture mapping as described above. FIG. 14 shows using the result of eigenface coded and decoded image being texture mapped onto the 3D fitted face model.

In accordance with a video conferencing application, once a face has been synthesized at the receiving end only the feature coordinates need to be sent to track a moving face. This greatly reduces the amount of data that needs to be processed making this method highly desirable for video conferencing.

Although the present invention has been described in detail, it should be understood that various changes, substitutions and alterations can be made thereto without departing from the spirit and scope of the present invention as defined by the appended claims.

What is claimed is:

1. A method of sending a facial image comprising the steps of:

using a set of multiscale templates locating a point on said facial image with the highest correlation coefficient at the best scale as the location of the face;

detecting facial features by template matching facial features to provide a set of points defining said facial feature locations;

encoding said facial image into eigenface parameters including the steps of providing a training database of eigenfaces and performing eigenface decomposition of an input image by finding eigenvectors and eigenvalues of points in free space represented by a training set of images;

transmitting and receiving said eigenvalues and said set of points defining said facial feature locations;

providing at a receiver a three-dimensional generic model of a face;

warping said generic face model using said set of points defining said facial feature locations;

said warping step includes using an affine transform for a portion of said face and bilinear transform to warp a different portion of said face;

decoding said facial image from eigenvalues to reconstruct the face image to define a texture image;

said decoding including the step of providing said training database of eigenfaces; and mapping said texture image onto said warped three-dimensional face model to provide a synthesized facial image.

2. The method of claim 1 wherein said facial features include a corner of an eye.

3. The method of claim 2 wherein said facial features include a corner of a mouth.

4. The method of claim 3 wherein said facial features include a tip of nose.

5. The method of claim 4 wherein said facial features includes sides of said nose.

6. The method of claim 5 wherein said facial features includes a facial outline.

7. The method of claim 1 wherein said facial features include corner of a mouth.

8. The method of claim 1 wherein said facial features include tip of nose.

9. The method of claim 8 wherein said facial features includes sides of said nose.

10. The method of claim 1 wherein said facial features includes facial outline.

11. The method of claim 1 wherein said method of defining said feature location includes matching feature templates of an eye.

12. The method of claim 1 wherein said method of defining said feature location includes matching feature templates of a mouth.

13. The method of claim 1 wherein said method of defining said feature location includes matching feature templates of a nose.

14. The method of claim 1 wherein said method of defining said feature location includes matching feature templates of a facial outline.

15. The method of claim 1 wherein said method of defining said feature location includes matching feature templates of a facial outline, an eye, a nose and a mouth.

16. The method of claim 1, wherein said affine transform is used in the upper and lower portions of said face and said bilinear transform is used in the middle part of said face.

* * * * *